(12) United States Patent
Wang et al.

(10) Patent No.: US 11,356,175 B2
(45) Date of Patent: Jun. 7, 2022

(54) OPTICAL MODULE TESTING METHOD, APPARATUS AND DEVICE, AND STORAGE MEDIUM

(71) Applicant: ZHENGZHOU YUNHAI INFORMATION TECHNOLOGY CO., LTD., Henan (CN)

(72) Inventors: Lin Wang, Henan (CN); Fazhi Liu, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 0 days.

(21) Appl. No.: 17/281,256

(22) PCT Filed: Jul. 31, 2019

(86) PCT No.: PCT/CN2019/098486
§ 371 (c)(1),
(2) Date: Mar. 30, 2021

(87) PCT Pub. No.: WO2020/103491
PCT Pub. Date: May 28, 2020

(65) Prior Publication Data
US 2022/0006525 A1 Jan. 6, 2022

(30) Foreign Application Priority Data
Nov. 19, 2018 (CN) .......................... 201811376796.5

(51) Int. Cl.
*H04B 10/079* (2013.01)
(52) U.S. Cl.
CPC ... *H04B 10/0799* (2013.01); *H04B 10/07957* (2013.01)
(58) Field of Classification Search
None
See application file for complete search history.

(56) References Cited

U.S. PATENT DOCUMENTS

2006/0036907 A1\* 2/2006 Inscoe .................. G06F 11/263
714/12
2007/0101214 A1\* 5/2007 Stauffer ............. G01R 31/2884
714/724
(Continued)

FOREIGN PATENT DOCUMENTS

CN  105260544 A  1/2016
CN  108169574 A  6/2018
(Continued)

OTHER PUBLICATIONS

International Search Report for PCT/CN2019/098486 dated Sep. 19, 2019, ISA/CN.
(Continued)

*Primary Examiner* — Darren E Wolf
(74) *Attorney, Agent, or Firm* — Yue (Robert) Xu; Apex Attorneys at Law, LLP

(57) ABSTRACT

A method, an apparatus and a device for detecting an optical module, and a storage medium are provided. The method includes: constructing insertion loss ranges meeting an insertion loss specification that respectively correspond to different signal frequencies in a predetermined signal frequency range, to construct a target insertion loss region; acquiring a microstripline length, a stripline length, a via number and a connector number of a to-be-detected optical module; inputting the microstripline length, the stripline length, the via number and the connector number to a pre-constructed first model, to determine an insertion loss curve of the to-be-detected optical module in the signal frequency range; and determining that the to-be-detected optical module is unqualified if a part of the insertion loss curve is outside the target insertion loss region.

11 Claims, 4 Drawing Sheets

(56) References Cited

U.S. PATENT DOCUMENTS

| | | | | |
|---|---|---|---|---|
| 2009/0110391 | A1* | 4/2009 | Matityahu | H04B 10/075 |
| | | | | 398/25 |
| 2011/0279109 | A1* | 11/2011 | Masuda | G01R 31/31917 |
| | | | | 324/96 |
| 2012/0243553 | A1* | 9/2012 | Rabinovich | G06F 13/128 |
| | | | | 370/463 |
| 2014/0092394 | A1* | 4/2014 | Detofsky | H04B 10/40 |
| | | | | 356/501 |
| 2019/0334275 | A1* | 10/2019 | Huang | H01R 12/724 |

FOREIGN PATENT DOCUMENTS

| | | |
|---|---|---|
| CN | 108304646 A | 7/2018 |
| CN | 109525308 A | 3/2019 |

OTHER PUBLICATIONS

Jie Yang, A kind of microstrip line—Simulation Analysis of Electromagnetic Characteristics of StriplineVia Interconnect Structure, Electronic Technology & Software Engineering, No. 8, Apr. 21, 2015, pp. 139-141.

* cited by examiner

OPTICAL MODULE TESTING METHOD, APPARATUS AND DEVICE, AND STORAGE MEDIUM

The present application is a national phase application of PCT international patent application PCT/CN2019/098486, filed on Jul. 31, 2019 which claims priority to Chinese Patent Application No. 201811376796.5, titled "OPTICAL MODULE TESTING METHOD, APPARATUS AND DEVICE, AND STORAGE MEDIUM", filed on Nov. 19, 2018 with the Chinese Patent Office, both of which are incorporated herein by reference in their entireties.

FIELD

The present disclosure relates to the technical field of optical modules, and in particular to a method, an apparatus and a device for detecting an optical module, and a storage medium.

BACKGROUND

As an upgraded version of a Gigabit Interface Converter (GBIC), a Small Form-factor Pluggable (SFP) optical module has a decreased size and decreased power consumption compared with the GBIC, and is widely used in optical communications. Based on this, a SFP+ optical module having the same size as the SFP optical module can transmit signals at a 10-gigabit level, and has advantages such as high density, low power consumption, and lower system construction costs. Thus, the SFP+ optical modules are widely used in the 10-gigabit market.

The conventional SFP+ optical modules differ significantly. Models of different signal transmission channels are designed for different scenarios to meet different user needs. Due to the different signal transmission channels, the SFP+ optical modules cannot be controlled according to a uniform definition. In verifying signal performance of a specific SFP+ optical module, the SFP+ optical module is generally required to be tested directly. That is, the SFP+ optical module is required to be applied with a detection signal at a certain frequency to obtain an output signal, and an insertion loss and/or a return loss at the current signal frequency is analyzed by using a software so as to determine whether the insertion loss and/or the return loss meets a specification, thereby determining whether the SFP+ optical module is qualified at the current signal frequency. In addition, the SFP+ optical module may operate at different signal frequencies. In this case, the above processing is required to be repeated at multiple different signal frequencies to determine whether the SPF+ optical module is qualified at the different frequencies, which is laborious and time-consuming. Especially in a case that there are many optical modules to be tested, testing the optical modules one by one requires a lot of manpower and testing time.

Therefore, how to effectively detect the optical module is a technical problem to be solved urgently by those skilled in the art.

SUMMARY

An object of the present disclosure is to provide a method, an apparatus and a device for detecting an optical module, and a storage medium, to effectively detect the optical module.

In order to solve the above technical problem, the following technical solutions are provided in the present disclosure.

A method for detecting an optical module is provided in the present disclosure. The method includes:
constructing insertion loss ranges meeting an insertion loss specification that respectively correspond to different signal frequencies in a predetermined signal frequency range, to construct a target insertion loss region;
acquiring a microstripline length, a stripline length, a via number and a connector number of a to-be-detected optical module;
inputting the microstripline length, the stripline length, the via number and the connector number to a pre-constructed first model, to determine an insertion loss curve of the to-be-detected optical module in the signal frequency range; and
determining that the to-be-detected optical module is unqualified if it is determined that a part of the insertion loss curve is outside the target insertion loss region.

In an embodiment, the method further includes:
constructing return loss ranges meeting a return loss specification that respectively correspond to the different signal frequencies in the predetermined signal frequency range, to construct a target return loss region;
inputting the microstripline length, the stripline length, the via number and the connector number to a pre-constructed second model, to determine a return loss curve of the to-be-detected optical module in the signal frequency range; and
determining that the to-be-detected optical module is unqualified in a case that a part of the return loss curve is outside the target return loss region.

In an embodiment, the first model is constructed by performing the following operations of:
constructing an initial model according to the following formula:

$$IL = k_1(f) \cdot L_1 + k_2(f) \cdot L_2 + k_3(f) \cdot N_1 + k_4(f) \cdot N_2,$$

where IL represents an insertion loss, $L_1$ represents the microstripline length, $L_2$ represents the stripline length, $N_1$ represents the via number, $N_2$ represents the connector number, and $k_1(f)$, $k_2(f)$, $k_3(f)$ and $k_4(f)$ are expressions each of which has an undetermined coefficient and is affected by a signal frequency f;
for each of multiple of sample optical modules, collecting a microstripline length, a stripline length, a via number and a connector number of the sample optical module, detecting an insertion loss of the sample optical module at each of different frequencies in the signal frequency range, and inputting the microstripline length, the stripline length, the via number the connector number and the insertion loss to the initial model, to determine the undetermined coefficient of each of the expressions $k_1(f)$, $k_2(f)$, $k_3(f)$, and $k_4(f)$ by fitting; and determining the initial model obtained after the undetermined coefficient of each of the expressions $k_1(f)$, $k_2(f)$, $k_3(f)$ and $k_4(f)$ is determined, as the first model.

In an embodiment, after the determining that the to-be-detected optical module is unqualified in a case that a part of the insertion loss curve is outside the target insertion loss region, the method further includes: outputting prompt information indicating that the insertion loss of the to-be-detected optical module is unqualified.

In an embodiment, after the outputting prompt information indicating that the insertion loss of the to-be-detected optical module is unqualified, the method further includes: recording an event that the insertion loss of the to-be-detected optical module is unqualified.

An apparatus for detecting an optical module is provided in the present disclosure. The apparatus includes: a first target region construction module, a parameter acquisition module, an insertion loss determination module, and a determination module for an unqualified insertion loss. The first target region construction module is configured to construct insertion loss ranges meeting an insertion loss specification that respectively correspond to different signal frequencies in a predetermined signal frequency range, to construct a target insertion loss region. The parameter acquisition module is configured to acquire a microstripline length, a stripline length, a via number and a connector number of a to-be-detected optical module. The insertion loss determination module is configured to input the microstripline length, the stripline length, the via number and the connector number to a pre-constructed first model, to determine an insertion loss curve of the to-be-detected optical module in the signal frequency range. The determination module for an unqualified insertion loss is configured to: in a case that a part of the insertion loss curve is outside the target insertion loss region, determine that the to-be-detected optical module is unqualified.

In an embodiment, the apparatus further includes: a second target region construction module, a return loss determination module, and a determination module for an unqualified return loss. The second target region construction module is configured to construct return loss ranges meeting a return loss specification that respectively correspond to the different signal frequencies in the predetermined signal frequency range, to construct a target return loss region. The return loss determination module is configured to input the microstripline length, the stripline length, the via number and the connector number to a pre-constructed second model, to determine a return loss curve of the to-be-detected optical module in the signal frequency range. The determination module for an unqualified return loss is configured to: in a case that a part of the return loss curve is outside the target return loss region, determine that the to-be-detected optical module is unqualified.

In an embodiment, the apparatus further includes a prompt information outputting module. The prompt information outputting module is configured to: after the determination module for an unqualified insertion loss determines that the to-be-detected optical module is unqualified, output prompt information indicating that the insertion loss of the to-be-detected optical module is unqualified.

A device for detecting an optical module is provided in the present disclosure. The device includes: a memory and a processor. The memory is configured to store a computer program. The processor is configured to execute the computer program to perform the method detecting an optical module described above.

A computer readable storage medium is provided in the present disclosure. The computer readable storage medium has stored thereon a computer program. The computer program, when executed by a processor, causes the processor to perform the method for detecting an optical module described above.

In the method according to the embodiment of the present disclosure, insertion loss ranges meeting an insertion loss specification that respectively correspond to different signal frequencies in a predetermined signal frequency range, to construct a target insertion loss region. A microstripline length, a stripline length, a via number and a connector number of a to-be-detected optical module are acquired. The microstripline length, the stripline length, the via number and the connector number are inputted to a pre-constructed first model, to determine an insertion loss curve of the to-be-detected optical module in the signal frequency range. If it is determined that a part of the insertion loss curve is outside the target insertion loss region, it is determined that the to-be-detected optical module is unqualified.

In the technical solutions according to the present disclosure, a first model and a target insertion loss region are pre-constructed. In detecting a to-be-detected optical module, only four parameters including a microstripline length, a stripline length, a via number and a connector number of the to-be-detected optical module are required to be acquired. The four parameters are inputted to the first model to obtain an insertion loss curve of the to-be-detected optical module in a predetermined signal frequency range. The target insertion loss region represents a region that meets an insertion loss specification. Thus, in a case that the insertion loss curve determined by the first model has a part outside the target insertion loss region, it is indicated that the insertion loss of the to-be-detected optical module is unqualified, and thus determining that the to-be-detected optical module is unqualified. With the solutions according to the present disclosure, the optical module can be detected based on the pre-constructed first model and the pre-constructed target insertion loss region by acquiring the four parameters, without detecting the insertion loss of the to-be-detected optical module by performing test. In addition, the four parameters are all hardware data of the to-be-detected optical module and can be easily obtained, so that the detection efficiency can be effectively improved.

BRIEF DESCRIPTION OF THE DRAWINGS

In order to more clearly illustrate the technical solutions in the embodiments of the present disclosure or in the conventional technology, the drawings to be used in the description of the embodiments or the conventional technology are briefly described below. Apparently, the drawings in the following description only show some embodiments of the present disclosure, and other drawings may be obtained by those skilled in the art from the drawings without any creative work.

DETAILED DESCRIPTION OF THE EMBODIMENTS

An object of the present disclosure is to provide a method for detecting an optical module, to effectively improve the detecting efficiency for the optical module.

In order to make those skilled in the art better understand the technical solutions in the present disclosure, the present disclosure is further described in detail below in conjunction with the drawings and specific embodiments. It is apparent that the embodiments described herein are only some embodiments of the present disclosure, rather than all the embodiments. All other embodiments obtained by those skilled in the art based on the embodiments of the present disclosure without any creative work fall into the protection scope of the present disclosure.

Figure 1:
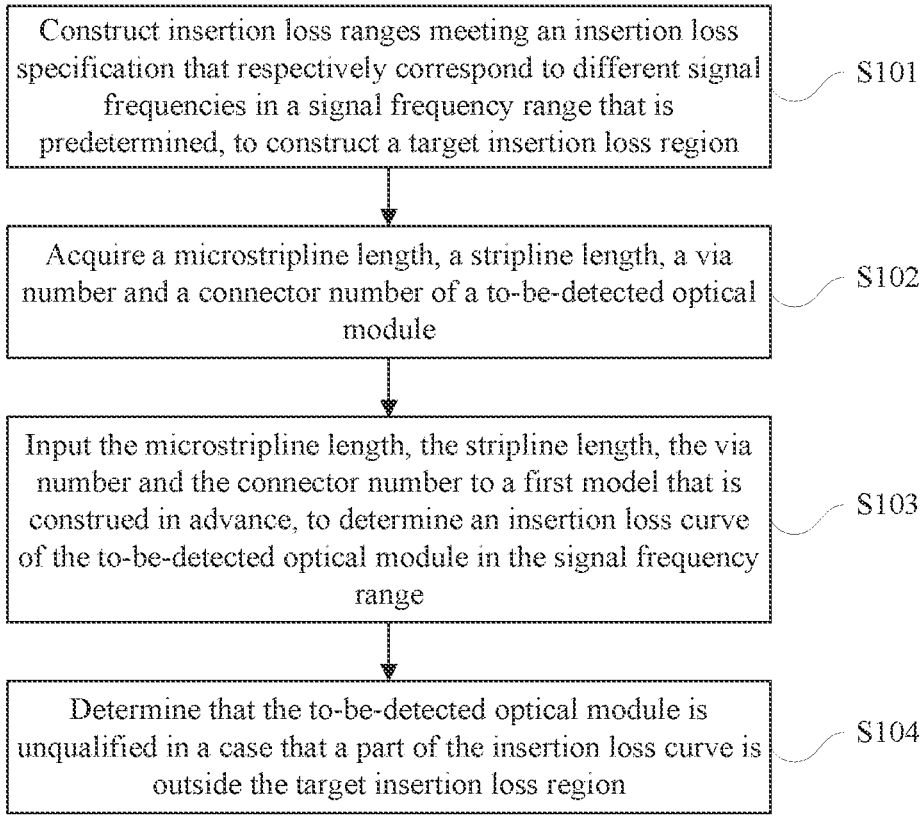
FIG. 1 is a flowchart showing a method for detecting an optical module provided in the present disclosure.

Reference is made to FIG. 1, which is a flowchart showing a method for detecting an optical module provided in the present disclosure. The method includes the following steps S101 to S104.

In step S101, insertion loss ranges meeting an insertion loss specification that respectively correspond to different signal frequencies in a predetermined signal frequency range are constructed, to construct a target insertion loss region.

Since an insertion loss of an optical module varies with a signal frequency of a transmission signal, different insertion loss reference standards are required to be set for different signal frequencies. The standard for one of the signal frequencies is an insertion loss range meeting an insertion loss specification that corresponds to the signal frequency. The insertion loss specification may be predetermined. For example, the insertion loss specification may be defined according to requirements for the insertion loss of the optical module in practical applications. Upon determination of insertion loss ranges respectively corresponding to the different signal frequencies, a target insertion loss region corresponding to a predetermined signal frequency range is determined. The target insertion loss region is an insertion loss range that meets requirements of the predetermined insertion loss specification.

Figure 2:
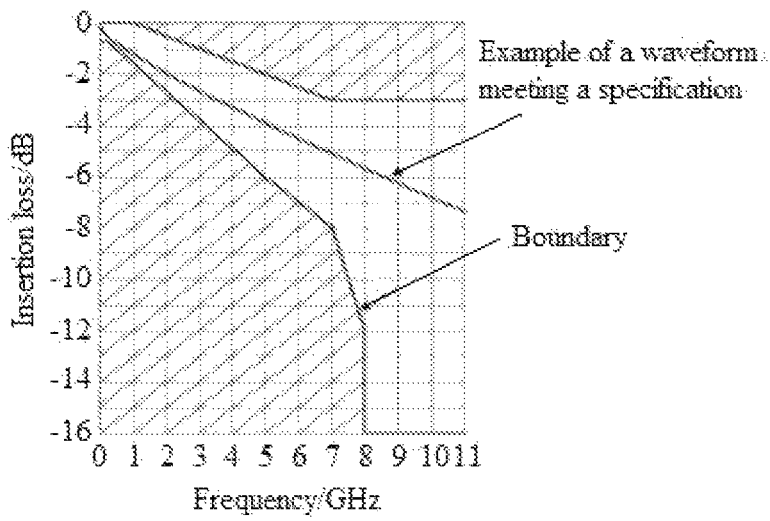
FIG. 2 is a schematic diagram showing a constructed target insertion loss region according to an embodiment of the present disclosure.

Reference is made to FIG. 2, which shows a target insertion loss region constructed based on an insertion loss specification that is determined according to an industrial specification according to an embodiment, in which the target insertion loss region is represented by a non-shaded region. Since current optical modules generally support a signal frequency up to a 10-gigabit level, the predetermined signal frequency range is from 0 to 11 GHz in FIG. 2. The predetermined signal frequency range may be regulated according to actual requirements. FIG. 2 further shows an example of a waveform that meets the insertion loss specification. The curve in the example has no part outside the constructed target insertion loss region.

In step S102, a microstripline length, a stripline length, a via number and a connector number of a to-be-detected optical module are acquired.

The insertion loss of the optical module is affected by various factors. The following main factors are considered in the present disclosure, including the microstripline length, the stripline length, the via number and the connector number. An insertion loss curve is determined subsequently based on the above four parameters, simplifying the process of determining the insertion loss curve. In this way, the optical module can be easily and conveniently detected with the solution of the present disclosure. The four parameters, i.e., the microstripline length, the stripline length, the via number and the connector number can be easily acquired.

For example, in an implementation, the four parameters are directly acquired from a product description. In another implementation, a channel model of a transmission signal of the to-be-detected optical module is acquired, and related data in the channel model is read to determine the microstripline length, the stripline length, the via number and the connector number of the to-be-detected optical module.

It should be noted that in the solutions of the present disclosure, the microstripline length is a total length of a microstripline in a signal transmission channel of the to-be-detected optical module. The stripline length is a total length of a stripline in the signal transmission channel. The via number is a total number of a via in the signal transmission channel. The connector number is a total number of a connector in the signal transmission channel, which is generally equal to one.

In step S103, the microstripline length, the stripline length, the via number and the connector number are inputted to a pre-constructed first model, to determine an insertion loss curve of the to-be-detected optical module in the signal frequency range.

The first model is a pre-constructed model. The microstripline length, the stripline length, the via number and the connector number are taken as input variables to be inputted to the first model, and an insertion loss is calculated by the first model. Therefore, upon setting of the signal frequency range, the insertion loss curve in the signal frequency range is determined by the first model.

The first model may be constructed based on experimental data and theoretical analysis. For example, in an implementation, the first model is constructed by common regression and fitting, in which influences of the microstripline length, the stripline length, the via number, the connector number and the signal frequency on the insertion loss are analyzed to establish an initial model having fitting coefficients, and sample data is inputted to the initial model to obtain the fitting coefficients of the initial model, for example, by a least square method.

In an embodiment of the present disclosure, the first model is constructed by performing the following steps 1 to 3.

In step 1, an initial model is constructed according to the following formula:

$$IL = k_1(f) \cdot L_1 + k_2(f) \cdot L_2 + k_3(f) \cdot N_1 + k_4(f) \cdot N_2,$$

where IL represents an insertion loss, $L_1$ represents the microstripline length, $L_2$ represents the stripline length, $N_1$ represents the via number, $N_2$ represents the connector number, and $k_1(f)$, $k_2(f)$, $k_3(f)$ and $k_4(f)$ are expressions each of which has an undetermined coefficient and is affected by a signal frequency f.

In step 2, for each of multiple sample optical modules, a microstripline length, a stripline length, a via number and a connector number of the sample optical module are collected, an insertion loss of the sample optical module at each of different frequencies in the signal frequency range is detected, and the microstripline length, the stripline length, the via number, the connector number and the insertion loss are inputted to the initial model to determine the undetermined coefficient of each of the expressions $k_1(f)$, $k_2(f)$, $k_3(f)$ and $k_4(f)$ by fitting.

In step 3, the initial model obtained after the undetermined coefficient of each of the expressions $k_1(f)$, $k_2(f)$, $k_3(f)$ and $k_4(f)$ is determined is determined as the first model.

In an embodiment, Each of $k_1(f)$, $k_2(f)$, $k_3(f)$ and $k_4(f)$ is defined as a polynomial with the signal frequency f as a variable, such as $k_1(f)=af^2+bf$ and $k_2(f)=cf$, to reduce the difficulty of constructing the first model. In other embodiments, each of $k_1(f)$, $k_2(f)$, $k_3(f)$ and $k_4(f)$ is defined in a more complex form, not just being in a simple form of polynomial, so that the insertion loss curve determined by using the first model is more consistent with an actual insertion loss curve of the to-be-detected optical module. After the undetermined coefficient of each of the expressions $k_1(f)$, $k_2(f)$, $k_3(f)$ and $k_4(f)$ is determined, the first model is constructed. For example, in an implementation, in the case of the signal frequency f being equal to 4 GHz, in the first model obtained after the undetermined coefficient is determined, the expressions $k_1(f)$, $k_2(f)$, $k_3(f)$ and $k_4(f)$ are calculated as: $k_1(f)=0.6$, $k_2(f)=0.6$, $k_3(f)=0.25$, $k_4(f)=0.3$. In this case, the insertion loss at the signal frequency of 4 GHz is calculated according to the following formula:

$$IL=0.65 \cdot L_1+0.6 \cdot L_2+0.25 \cdot N_1+0.3 \cdot N_2.$$

In step S104, if it is determined that a part of the insertion loss curve is outside the target insertion loss region, it is determined that the to-be-detected optical module is unqualified.

Figure 3:
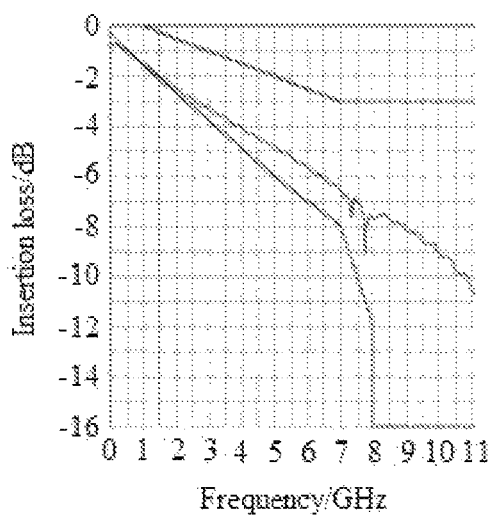
FIG. 3 is a schematic diagram showing an insertion loss curve of a to-be-detected optical module according to an embodiment of the present disclosure.

In a case that the insertion loss curve determined in step S103 has a part outside the target insertion loss region, it is indicated that the insertion loss of the to-be-detected optical module does not meet the predetermined insertion loss specification, and it is determined that the to-be-detected optical module is unqualified. In a case that the insertion loss curve of the to-be-detected optical module has no part outside the target insertion loss region, it is indicated that the insertion loss of the to-be-detected optical module is qualified. For example, in an embodiment shown in FIG. 3, the insertion loss curve of the to-be-detected optical module is in the target insertion loss region.

In the method according to the embodiment of the present disclosure, insertion loss ranges meeting an insertion loss specification that respectively correspond to different signal frequencies in a predetermined signal frequency range are constructed, to construct a target insertion loss region. A microstripline length, a stripline length, a via number and a connector number of a to-be-detected optical module are acquired. The microstripline length, the stripline length, the via number and the connector number are inputted to a pre-constructed first model, to determine an insertion loss curve of the to-be-detected optical module in the signal frequency range. If it is determined that a part of the insertion loss curve is outside the target insertion loss region, it is determined that the to-be-detected optical module is unqualified.

In the technical solutions according to the present disclosure, a first model and a target insertion loss region are pre-constructed. In detecting a to-be-detected optical module, only four parameters including a microstripline length, a stripline length, a via number and a connector number of the to-be-detected optical module are required to be acquired. The four parameters are inputted to the first model to obtain an insertion loss curve of the to-be-detected optical module in a predetermined signal frequency range. The target insertion loss region represents a region that meets an insertion loss specification. Thus, in a case that the insertion loss curve determined by the first model has a part outside the target insertion loss region, it is indicated that the insertion loss of the to-be-detected optical module is unqualified, and thus determining that the to-be-detected optical module is unqualified. With the solutions according to the present disclosure, the optical module can be detected based on the pre-constructed first model and the pre-constructed target insertion loss region by acquiring the four parameters, without detecting the insertion loss of the to-be-detected optical module by performing test. In addition, the four parameters are all hardware data of the to-be-detected optical module and can be easily obtained, so that the detection efficiency can be effectively improved.

In an embodiment of the present disclosure, the method further includes:

constructing return loss ranges meeting a return loss specification that respectively correspond to the different signal frequencies in the predetermined signal frequency range, to construct a target return loss region;

inputting the microstripline length, the stripline length, the via number and the connector number to a pre-constructed second model, to determine a return loss curve of the to-be-detected optical module in the signal frequency range; and determining that the to-be-detected optical module is unqualified in a case that a part of the return loss curve is outside the target return loss region.

Figure 4:
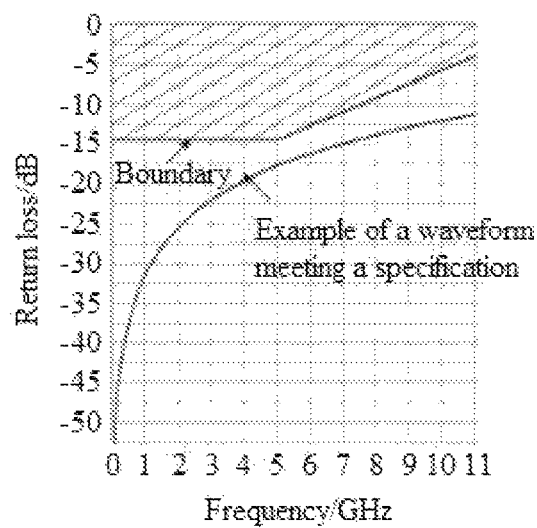
FIG. 4 is a schematic diagram showing a constructed target return loss region according to an embodiment of the present disclosure.

Since the return loss is an important indicator of the optical module, it is determined that the to-be-detected optical module is unqualified in a case that the return loss is unqualified. Therefore, the return loss curve of the to-be-detected optical module is determined in this embodiment. In determining whether the return loss is qualified, the process of determining whether the insertion loss is qualified described above may be referred to. The predetermined signal frequency range in this embodiment may be the same as that described in step S101, and the predetermined return loss specification may be set according to actual requirements. For example, FIG. 4 shows a target return loss region constructed according to an industrial specification, in which the target return loss region is represented by a non-shaded region.

Figure 5:
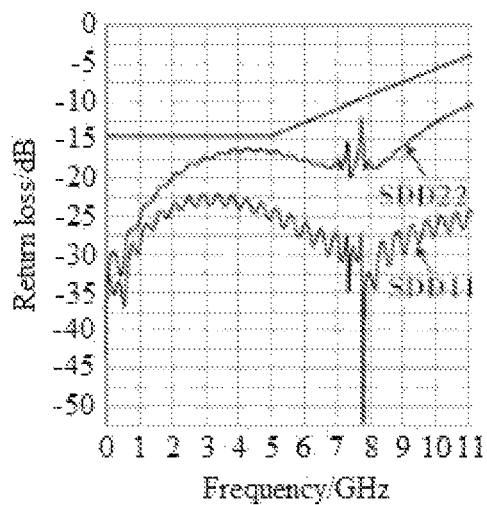
FIG. 5 is a schematic diagram showing a return loss curve of a to-be-detected optical module according to an embodiment of the present disclosure.

It should be noted that, since the four parameters including the microstripline length, the stripline length, the via number and the connector number are all hardware parameters of a signal channel, it is required to verify whether a return loss curve of each of two signal channels is in the target return loss region in a case that differential signals are used in the optical module. That is, for each of the two signal channels, related parameters are determined to determine a return loss curve. For example, in an embodiment shown in FIG. 5, the return losses of two signal channels of the to-be-detected optical module are both qualified.

In an embodiment of the present disclosure, after step S104, the method further includes: outputting prompt information indicating that the insertion loss of the to-be-detected optical module is unqualified.

The prompt information may be text prompt information displayed on a display, sound prompt information, light prompt information, and the like, such that the operator can timely notice that the insertion loss of the to-be-detected optical module is unqualified. In addition, the prompt information is transmitted remotely, so that the operator can learn the situation remotely. Moreover, if it is determined that the return loss of the to-be-detected optical module is unqualified, prompt information indicating that the return loss of the to-be-detected optical module is unqualified is outputted.

In an implementation, after outputting the prompt information indicating that the insertion loss of the to-be-detected optical module is unqualified, an event that the insertion loss of the to-be-detected optical module is unqualified is recorded, facilitating the operator querying historical data. For example, which batch of optical modules has more events of unqualified insertion loss can be determined to facilitate subsequent processing.

Corresponding to the above method embodiments, an apparatus for detecting an optical module is further provided according to an embodiment of the present disclosure. The apparatus for detecting an optical module described below and the method for detecting an optical module described above may be referred to each other correspondingly.

Figure 6:
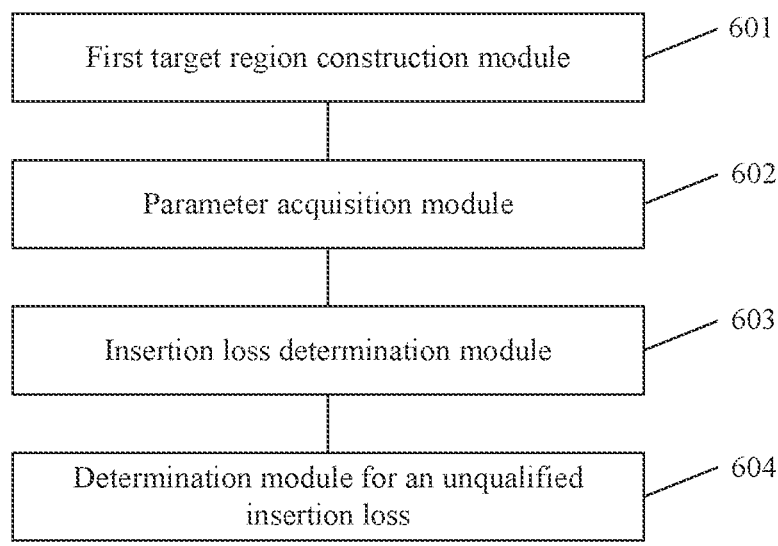
FIG. 6 is a schematic structural diagram of an apparatus for detecting an optical module provided in the present disclosure.

Reference is made to FIG. 6, which is a schematic structural diagram of an apparatus for detecting an optical module provided in the present disclosure. The apparatus includes a first target region construction module 601, a parameter acquisition module 602, an insertion loss determination module 603, and a determination module 604 for an unqualified insertion loss.

The first target region construction module 601 is configured to insertion loss ranges meeting an insertion loss specification that respectively correspond to different signal frequencies in a predetermined signal frequency range, to construct a target insertion loss region.

The parameter acquisition module 602 is configured to acquire a microstripline length, a stripline length, a via number and a connector number of a to-be-detected optical module.

The insertion loss determination module 603 is configured to input the microstripline length, the stripline length, the via number and the connector number to a pre-constructed first model, to determine an insertion loss curve of the to-be-detected optical module in the signal frequency range.

The determination module 604 for an unqualified insertion loss is configured to: in a case that a part of the insertion loss curve is outside the target insertion loss region, determine that the to-be-detected optical module is unqualified.

In an embodiment of the present disclosure, the apparatus further includes: a second target region construction module, a return loss determination module, and a determination module for an unqualified return loss.

The second target region construction module is configured to construct return loss ranges meeting a return loss specification that respectively correspond to the different signal frequencies in the predetermined signal frequency range, to construct a target return loss region.

The return loss determination module is configured to input the microstripline length, the stripline length, the via number and the connector number to a pre-constructed second model, to determine a return loss curve of the to-be-detected optical module in the predetermined signal frequency range.

The determination module for an unqualified return loss is configured to: in a case that a part of the return loss curve is outside the target return loss region, determine that the to-be-detected optical module is unqualified.

In an embodiment of the present disclosure, the apparatus further includes a prompt information outputting module.

The prompt information outputting module is configured to: after the determination module 604 for an unqualified insertion loss determines that the to-be-detected optical module is unqualified, output prompt information indicating that the insertion loss of the to-be-detected optical module is unqualified.

In an embodiment of the present disclosure, the apparatus further includes a record module.

The record module is configured to record an event that the insertion loss of the to-be-detected optical module is unqualified.

Corresponding to the method embodiments and the apparatus embodiments, there are further provided a device for detecting an optical module and a computer readable storage medium according to embodiments of the present disclosure. The above description may be referred to.

Figure 7:
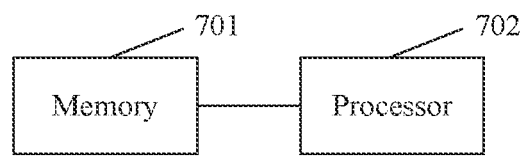
FIG. 7 is a schematic structural diagram of a device for detecting an optical module provided in the present disclosure.

Reference is made to FIG. 7, which is a schematic structural diagram of a device for detecting an optical module provided in the present disclosure. The device includes a memory 701 and a processor 702.

The memory 701 is configured to store a computer program.

The processor 702 is configured to execute the computer program to perform the method for detecting an optical module according to any one of the above embodiments.

The computer readable storage medium has stored thereon a computer program. When executed by a processor, the computer program causes the processor to perform the method for detecting an optical module according to any one of the above embodiments. The computer readable storage medium herein includes a random access memory (RAM), an internal memory, a read only memory (ROM), an electrically programmable ROM, an electrically-erasable programmable ROM, a register, a hard disk, a removable disk drive, a CD-ROM, or other types of storage mediums well known in the technical field.

It should further be noted that the relationship terms such as "first" and "second" are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a series of elements includes not only the elements but also other elements that are not enumerated, or further includes elements inherent for the process, method, article or device. Unless expressively limited otherwise, the statement "comprising (including) one . . . " does not exclude the case that other similar elements may exist in the process, method, article or device.

It is learned by those skilled in the art that, units and steps in each method described in conjunction with the embodiments disclosed herein can be realized by electronic hardware, computer software or a combination thereof. In order to clearly illustrate interchangeability of the hardware and the software, steps and composition of each embodiment have been described generally in view of functions in the above specification. Whether these functions are executed in a hardware way or in a software way depends on applications of the technical solution and design constraint conditions. Those skilled in the art can implement described functions thereof for each application by different methods, and this implementation is not considered to be beyond the scope of the present disclosure.

Specific examples are used in the present disclosure to describe the principle and the embodiments of the present disclosure. The embodiments described above are only used to assist in understanding the technical solutions and the core concept of the present disclosure. It should be noted that improvements and modifications may be made to the present disclosure by those skilled in the art without departing from the principle of the present disclosure. Those improvements and modifications should also fall in the protection scope of the claims of the present disclosure.

The invention claimed is:

1. A method for detecting an optical module, the method comprising:

constructing insertion loss ranges meeting an insertion loss specification that respectively correspond to different signal frequencies in a predetermined signal frequency range, to construct a target insertion loss region;

acquiring a microstripline length, a stripline length, a via number and a connector number of a to-be-detected optical module;

inputting the microstripline length, the stripline length, the via number and the connector number to a pre-constructed first model, to determine an insertion loss curve of the to-be-detected optical module in the signal frequency range;

determining that the to-be-detected optical module is unqualified if it is determined that a part of the insertion loss curve is outside the target insertion loss region;

wherein the first model is constructed by performing the following operations of:

constructing an initial model according to the following formula:

$$IL = k_1(f) \cdot L_1 + k_2(f) \cdot L_2 + k_3(f) \cdot N_1 + k_4(f) \cdot N_2,$$

wherein IL represents an insertion loss, $L_1$ represents the microstripline length, $L_2$ represents the stripline length, $N_1$ represents the via number, $N_2$ represents the connector number, and $k_1(f)$, $k_2(f)$, $k_3(f)$ and $k_4(f)$ are expressions each of which has an undetermined coefficient and is affected by a signal frequency f;

for each of a plurality of sample optical modules, collecting a microstripline length, a stripline length, a via number and a connector number of the sample optical module, detecting an insertion loss of the sample optical module at each of different frequencies in the signal frequency range, and inputting the microstripline length, the stripline length, the via number the connector number and the insertion loss to the initial model, to determine the undetermined coefficient of each of the expressions $k_1(f)$, $k_2(f)$, $k_3(f)$ and $k_4(f)$ by fitting; and determining the initial model obtained after the undetermined coefficient of each of the expressions $k_1(f)$, $k_2(f)$, $k_3(f)$ and $k_4(f)$ is determined, as the first model.

2. The method for detecting an optical module according to claim 1, the method further comprising:

constructing return loss ranges meeting a return loss specification that respectively correspond to the different signal frequencies in the predetermined signal frequency range, to construct a target return loss region;

inputting the microstripline length, the stripline length, the via number and the connector number to a pre-constructed second model, to determine a return loss curve of the to-be-detected optical module in the signal frequency range; and determining that the to-be-detected optical module is unqualified in a case that a part of the return loss curve is outside the target return loss region.

3. The method for detecting an optical module according to claim 1, wherein after the determining that the to-be-detected optical module is unqualified in a case that a part of the insertion loss curve is outside the target insertion loss region, the method further comprises:

outputting prompt information indicating that the insertion loss of the to-be-detected optical module is unqualified.

4. The method for detecting an optical module according to claim 3, wherein after the outputting prompt information indicating that the insertion loss of the to-be-detected optical module is unqualified, the method further comprises:

recording an event that the insertion loss of the to-be-detected optical module is unqualified.

5. An apparatus for detecting an optical module, the apparatus comprising:

a first target region construction module, configured to construct insertion loss ranges meeting an insertion loss specification that respectively correspond to different signal frequencies in a predetermined signal frequency range, to construct a target insertion loss region;

a parameter acquisition module, configured to acquire a microstripline length, a stripline length, a via number and a connector number of a to-be-detected optical module;

an insertion loss determination module, configured to input the microstripline length, the stripline length, the via number and the connector number to a pre-constructed first model, to determine an insertion loss curve of the to-be-detected optical module in the signal frequency range; and a determination module for an unqualified insertion loss, configured to: in a case that a part of the insertion loss curve is outside the target insertion loss region, determine that the to-be-detected optical module is unqualified.

6. The apparatus for detecting an optical module according to claim 5, the apparatus further comprising:

a second target region construction module, configured to construct return loss ranges meeting a return loss specification that respectively correspond to the different signal frequencies in the predetermined signal frequency range, to construct a target return loss region;

a return loss determination module, configured to input the microstripline length, the stripline length, the via number and the connector number to a pre-constructed second model, to determine a return loss curve of the to-be-detected optical module in the signal frequency range; and a determination module for an unqualified return loss, configured to: in a case that a part of the return loss curve is outside the target return loss region, determine that the to-be-detected optical module is unqualified.

7. The apparatus for detecting an optical module according to claim 5, the apparatus further comprising:

a prompt information outputting module, configured to: after the determination module for an unqualified insertion loss determines that the to-be-detected optical module is unqualified, output prompt information indicating that the insertion loss of the to-be-detected optical module is unqualified.

8. A device for detecting an optical module, the device comprising:

a memory, configured to store a computer program, and a processor, configured to execute the computer program to perform the method for detecting an optical module according to claim 1.

9. A computer readable storage medium having stored thereon a computer program, wherein the computer program, when executed by a processor, causes the processor to perform the method for detecting an optical module claim 1.

10. The method for detecting an optical module according to claim 2, wherein after the determining that the to-be-detected optical module is unqualified in a case that a part of the insertion loss curve is outside the target insertion loss region, the method further comprises:

outputting prompt information indicating that the insertion loss of the to-be-detected optical module is unqualified.

11. The apparatus for detecting an optical module according to claim 6, the apparatus further comprising:
  a prompt information outputting module, configured to: after the determination module for an unqualified insertion loss determines that the to-be-detected optical module is unqualified, output prompt information indicating that the insertion loss of the to-be-detected optical module is unqualified.

\* \* \* \* \*